Sept. 15, 1970     S. R. SCHOENBERGER     3,528,578

MOTORCYCLE RACK

Filed April 25, 1968     2 Sheets-Sheet 1

Simon Ray Schoenberger
INVENTOR.

BY *Clarence A. O'Brien*
*and Harvey B. Jacobson*
Attorneys

Sept. 15, 1970   S. R. SCHOENBERGER   3,528,578
MOTORCYCLE RACK
Filed April 25, 1968   2 Sheets-Sheet 2
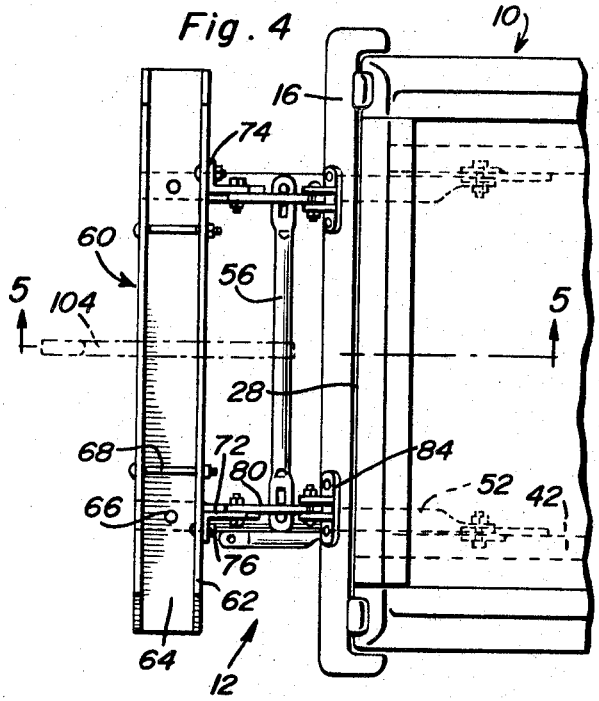
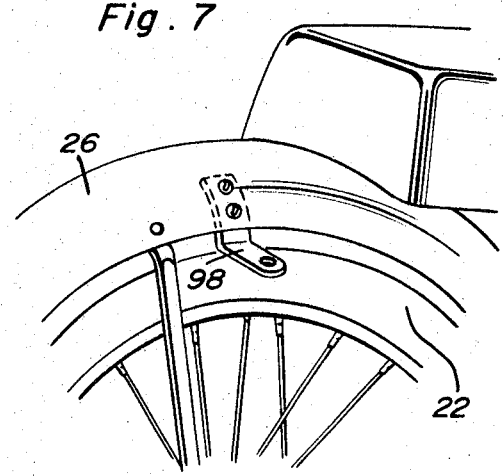
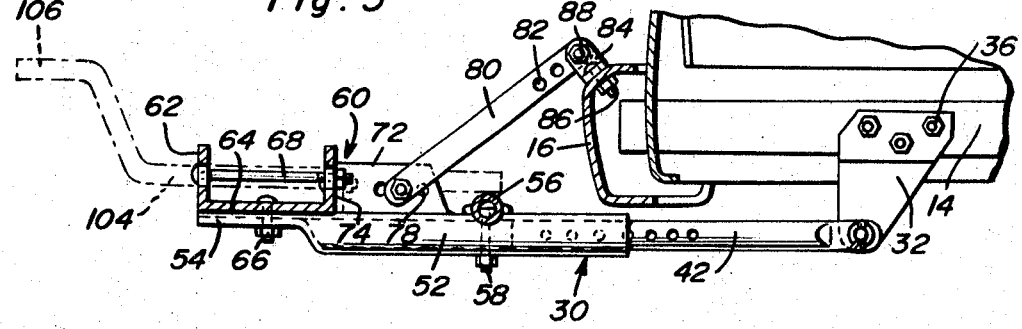
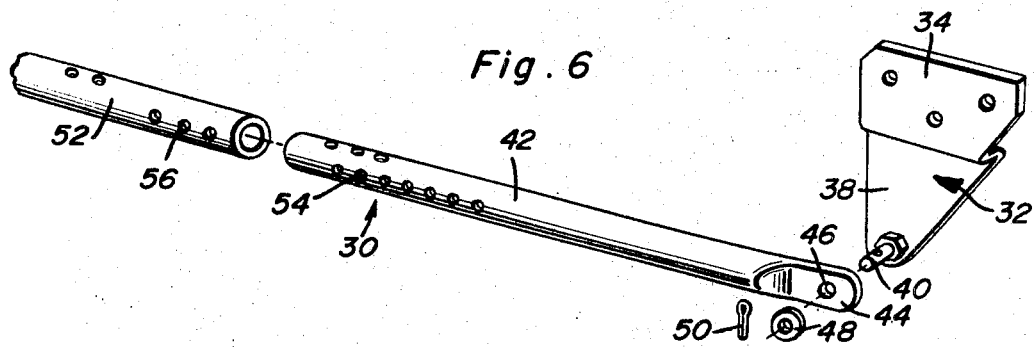
Simon Ray Schoenberger
INVENTOR.

3,528,578
MOTORCYCLE RACK
Simon Ray Schoenberger, 5121 Swartz Road,
Kansas City, Kans. 66106
Filed Apr. 25, 1968, Ser. No. 730,675
Int. Cl. B60r 9/10
U.S. Cl. 214—450   14 Claims

ABSTRACT OF THE DISCLOSURE

A carrier rack, secured to the frame and bumper of a vehicle, on which a motorcycle is supported in a carrying position of the rack. The rack when released from the bumper connection rests on the ground to facilitate loading and unloading of the motorcycle and is elevated to the carrying position by a bumper jack.

This invention relates to an attachment for an automotive vehicle and more particularly to a load carrying rack attachment having means for facilitating the loading of the rack.

Load carrying racks attachable to vehicle frames, are well known. Generally, it is necessary to elevate the load onto the rack. Also, considerable difficulty is encountered in stabilizing certain loads on the carrier rack, such as motorcycles.

Accordingly, an important object of the present invention is to provide a carrier rack attachment for automotive vehicles which is pivotally displaceable from a lowered loading position to a substantially horizontal, carrying position by means of a conventional bumper jack.

In accordance with the present invention, the carrier rack is formed by two extensible supporting arms which are pivotally mounted by brackets on the vehicle frame and extend from the vehicle below the bumper forwardly or rearwardly thereof. Bumper mounted brackets, are removably connected through links to the rack for support thereof in a substantially horizontal carrying position. When disconnected from the bumper brackets, the rack may rest on the ground in a lowered loading position. In one embodiment of the invention, a load positioning member in the form of a channel track is supported between the rack supporting arms and is adapted to receive the tires of a motorcycle therein. Tire holding bolts extend transversely through the channel track in engagement with the motorcycle tires so as to prevent rolling or sliding of the motorcycle from the carrier rack, special brackets being secured to the motocycle to which brace bars may be connected for stabilized support of the motorcycle on the rack in all positions thereof. The rack is also provided with facilities for guidingly receiving a crank rod adapted to be engaged by the load elevating component of a conventional bumper jack in the lowered loading position of the rack. Thus, the loaded rack may be elevated by means of the bumper jack to its carrying position in which the rack is maintained after it is link connected to the bumper mounted brackets aforementioned.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 4 is a top plan view of the vehicle mounted, load carrying rack in its carrying position with the load removed.

FIG. 5 is a side sectional view taken substantially through a plane indicated by section line 5—5 in FIG. 4.

FIG. 6 is a perspective view of certain disassembled parts of the load carrying rack attachment.

FIG. 7 is a partial perspective view of a portion of the motorcycle load showing an attachment bracket mounted thereon in order to accommodate carrying of the motorcycle on the rack.

Figure 1:
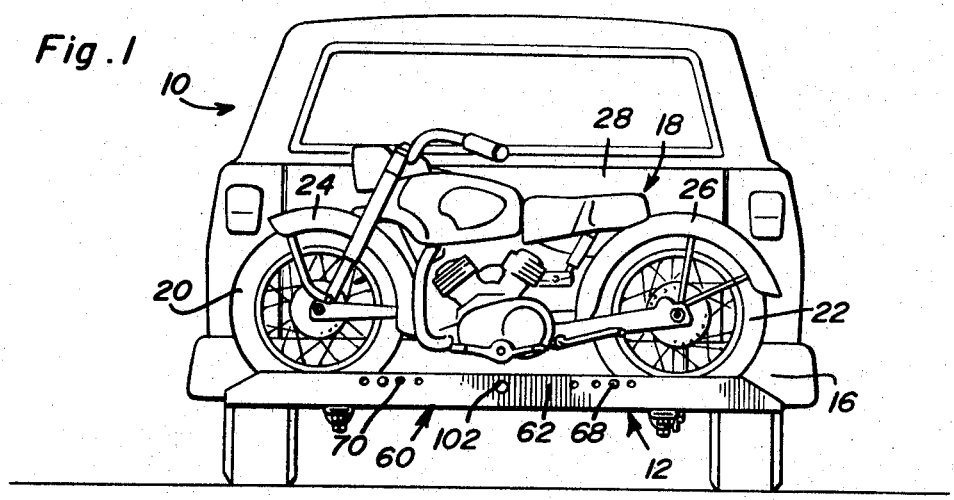
FIG. 1 is a rear elevational view of an automotive vehicle on which the carrying rack of the present invention is mounted supporting a motorcycle thereon.
Figure 2:
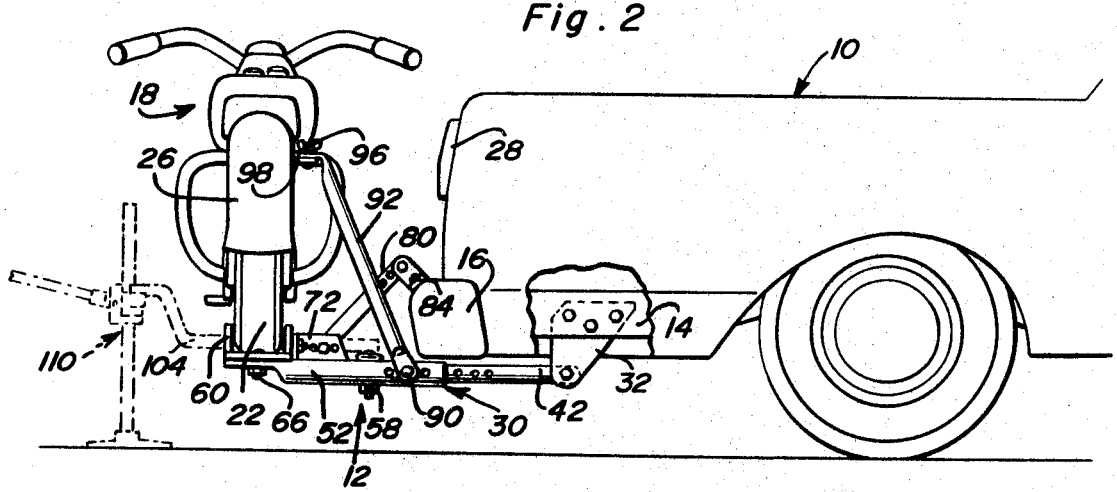
FIG. 2 is a side elevational view of the vehicle mounted, load carrying rack illustrated in FIG. 1.

Referring now to the drawings in detail, FIGS. 1 and 2 illustrate a typical automotive vehicle generally denoted by reference numeral 10 to which the load carrying rack of the present invention is attached, the rack being generally referred to by reference numeral 12. The rack 12 is attached to the vehicle chassis including the frame members 14 as shown in FIG. 2 and extends rearwardly from the vehicle below and beyond the rear bumper 16 in order to support thereon, a load such as a typical motorcycle 18. Insofar as the present invention is concerned, the motorcycle includes a front, pneumatic tired wheel 20, a rear, pneumatic tired wheel 22, a front fender 24 and a rear fender 26. By means of these wheels and fenders, the motorcycle is positioned and firmly held on the load carrying rack 12 in an upright position as shown in FIGS. 1 and 2, extending transversely across the vehicle 10 closely spaced from its rear end 28.

Referring now to FIGS. 5 and 6 in particular, it will be observed that the rack includes a pair of adjustably extensible supporting arms generally denoted by reference numeral 30 which are pivotally mounted on the vehicle chassis frame members 14 by means of the pivot brackets 32. Each pivot bracket accordingly includes an upper, offset attachment portion 34 having apertures formed therein through which the fastener assemblies 36 secure the brackets to the chassis frame members. The lower mounting portions 38 of the brackets are provided with pivotal mounting studs 40 on which the supporting arms 30 are pivotally mounted. Each of the supporting arms consists of a tubular rod member 42 one end of which is provided with a flattened portion 44 having an aperture 46 through which the mounting stud 40 extends. A washer 48 and cotter pin 50 hold the rod 42 assembled on the mounting stud. The rod 42 is telescopingly received within a tubular member 52 having a flattened end portion 54 at one end opposite the end portion 44, angularly orientated perpendicular to the end portion 44. Adjustment apertures 54 and 56 are respectively formed in the telescoping rod members 42 and 52, adapted to be aligned with each other in longitudinally adjusted positions of the rod members so that the rod members may be interconnected in such adjusted positions as will be hereafter explained.

As more clearly seen in FIG. 4, the tubular rod members 52 of each of the supporting arms 30, are interconnected by a transversely extending cross-bar 56 the opposite ends of which are secured to the tubular rod members 52 by fastener bolt assemblies 58 as more clearly seen in FIG. 5. The tubular rod members 52 are also interconnected between the end portions 54 thereof, by a transversely extending channel member 60 having a pair of parallel upstanding legs 62 interconnected by a horizontal web 64 secured to the end portions 54 of the rod members 52 by the fastener assemblies 66. As shown in FIGS. 4 and 5, a pair of spaced bolts 68 extend transversely through the track formed by the channel member spaced above the web 64. Accordingly, aligned apertures are formed in the legs 62 of the channel member at the proper positions for receiving the bolts 68 so that they may engage the undersides of the wheel tires 20 and 22 of the motorcycle when positioned in the channel member track as shown in FIG. 1. A plurality of aligned apertures 70 are accordingly formed in the legs 62 of the channel member through which the holding bolts 68 may be inserted in order to accommodate different diameter motorcycle wheels. It will be apparent that the holding bolts 68 are installed, after the motorcycle is positioned within the track of the channel member, so as to prevent the motorcycle from being rolled or slid out of the channel track in either direction.

Each of the tubular rod members 52 to which the channel member 60 is secured, has an angle member 72 welded on top. Each angle member includes a leg portion 74 abutting one of the vertical legs of the channel member to which it is attached by means of a fastener assembly 76, the other leg portion of the angle member being provided with a plurality of spaced apertures 78 so as to pivotally mount one end of a link member 80 in an adjusted position. Thus, the carrying rack is provided with a pair of such link members 80 associated with each of the supporting arms 30 by means of which the supporting arms may be held in a substantially horizontal carrying position. The upper end of each link member as more clearly seen in FIG. 5 includes apertures 82 for adjustable connection of the link member to attachment brackets 84 secured in proper spaced relation on the bumper 16 by means of fastener assemblies 86. Removable fastener assemblies 88 secure the link members to the brackets 84 when the supporting arms 30 are in the carrying position as illustrated in FIGS. 2 and 5. It will be apparent, that removal of the fastener assemblies 88 disconnecting the link members 80 from the bumper brackets 84 will permit the rack to be lowered to a loading position as shown in FIG. 3.

The supporting arms 30 are locked in a longitudinally adjusted position by means of fastener bolt assemblies 90 which extend through aligned apertures in the tubular rod members 42 and 52 and through the lower ends of load stabilizing brace bars 92 that extend upwardly and rearwardly from the supporting arms 30. The upper ends 94 of the brace bars are secured by fasteners such as the wing nut assemblies 96 to special brackets that are secured to and extend laterally from the motorcycle fenders as more clearly seen in FIG. 7. Thus, the motorcycle is firmly held against lateral displacement after being locked in position in the channel member 60 by the holding bolts 68.

Figure 3:
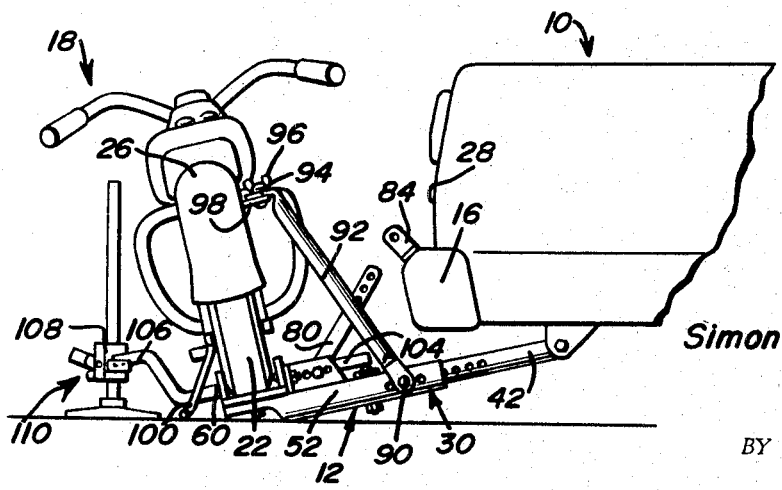
FIG. 3 is a side elevational view of the load carrying rack in a lowered loading position.

It will be apparent that the rack may be lowered to the loading position illustrated in FIG. 3 by disconnection of link members 80 from the bumper brackets 84 in accordance with the loading procedure associated with the present invention. The motorcycle 18 may then be readily moved into the channel member from either longitudinal end thereof until the fender mounted brackets 98 are aligned with the upper ends 94 of the brace bars 92. It will be appreciated, that these brace bars 92 are secured to the supporting arms after the arms have been longitudinally adjusted to the desired length. The length of the supporting arms is selected so that the supporting arms will be supported on the ground at an angle corresponding to the angle at which the motorcycle is temporarily supported by means of its kick stand 100 as illustrated in FIG. 3. After the brace bars 92 are secured to the fender brackets 98 by means of the wing nuts 96, the motorcycle tires are locked in place in the track of the channel member 60 by means of the holding bolts 68.

The legs 62 of the channel member 60 are provided with centrally located, aligned guide openings 102 as shown in FIG. 1 in order to receive a load transfer crank rod 104 as shown by doted line in FIGS. 2, 4 and 5. This crank rod may be inserted through the guide openings 102 for overlying engagement with the cross bar 56 and has an offset end portion 106 spaced a sufficient distance above the ground when the rack is in its lowered loading position in order to be engaged by the load engaging component 108 of a conventional bumper jack 110 as illustrated in FIG. 3. Thus, after the rack is loaded with the motorcycle 18 as aforementioned, the crank rod 104 is inserted and the jack 110 positioned for engagement therewith in order to elevate the loaded rack from the lowered loading position shown in FIG. 3 to the carrying position shown in FIG. 2. When elevated to the carrying position, the link members 80 are connected by the removable fastener assemblies 88 to the bumper brackets 84 in order to hold the rack in its carrying position upon removal of the bumper jack 110 and the crank rod 104. By reversal of the loading procedure described, the motorcycle 18 may be unloaded from the rack.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a vehicle having a frame and a bumper fixed thereto at one end, a load carrier assembly including at least two supporting arms pivotally mounted by the vehicle frame extending therefrom beyond said one end of the vehicle, load positioning means connected to said supporting arms remotely spaced from the bumper, a crossbar interconnecting the supporting arms between the positioning means and the bumper, disconnectable link means connected to the supporting arms and removably connected to the bumper in a substantially horizontal carrying position of the supporting arms, and means engageable with said positioning means in a loading position of the supporting arms for elevating the same to the carrying position, said elevating means including a rod having an offset portion, guide means mounted by the load positioning means receiving the rod in engagement with the crossbar, and a bumper jack device engageable with the offset portion of the rod to lift the supporting arms from said loading position resting on the ground.

2. The combination of claim 1 wherein each of said supporting arms includes a pair of telescopingly adjustable rod members, one of said members being pivotally connected to the vehicle frame, and adjustable connecting means interconnecting the link means with at least the other of said rod members, said positioning means and the crossbar being interconnected with the other of the rod members.

3. The combination of claim 2 wherein said adjustable connecting means includes an angle bar secured to the other of the rod members having a first leg portion abutting the load positioning means and a second leg portion to which the link means is pivotally connected in spaced relation to the load positioning means.

4. The combination of claim 3 wherein said load positioning means includes a channel member forming a tire-receiving track and at least two tire engaging bolts extending transversely through the channel member, said guide means comprising a pair of transversely aligned apertures formed centrally in the channel member through which the rod is adapted to extend in overlying relation to the crossbar.

5. The combination of claim 4 including a brace bar having opposite ends, one end of the brace bar interconnecting the rod members in longitudinally adjusted positions, the other end of the brace bar adapted to be connected to a load carried on the load positioning means.

6. In combination with a vehicle having a frame and a bumper fixed thereto at one end, a load carrier assembly including at least two supporting armes pivotally mounted by the vehicle frame extending therefrom beyond said one end of the vehicle, load positioning means connected to said supporting arms remotely spaced from the bumper, a crossbar interconnecting the supporting arms between the positioning means and the bumper, disconnectable link means connected to the supporting arms and removably connected to the bumper in a substantially horizontal carrying position of the supporting arms, and means engageable with said positioning means in a loading position of the supporting arms for elevating the same to the carrying position, each of said supporting arms including a pair of telescopingly adjustable rod members, one of said members being pivotally connected to the vehicle frame, adjustable connecting means interconnecting the link means with at least the other of said rod members, said positioning means and the crossbar being interconnected with the other of the rod members, and a brace bar having opposite ends, one end of the brace bar interconnecting the rod members in longitudinally adjusted positions, the other end of the brace bar adapted to be connected to a load carried on the load positioning means.

7. The combination of claim 6 wherein said adjustable connecting means includes an angle bar secured to the other of the rod members having a first leg portion abutting the load positioning means and a second leg portion to which the link means is pivotally connected in spaced relation to the load positioning means.

8. The combination of claim 1 wherein said load positioning means includes a channel member forming a tire-receiving track and at least two tire engaging bolts extending transversely through the channel member, said guide means comprising a pair of transversely aligned apertures formed centrally in the channel member through which the rod is adapted to extend in overlying relation to the crossbar.

9. In combination with a vehicle having a frame and a bumper fixed thereto at one end, a load carrier assembly including pivotal supporting means mounted by the vehicle frame extending therefrom beyond said one end of the vehicle, load positioning means connected to said supporting means remotely spaced from the bumper, disconnectable link means connected to the supporting means and removably connected to the bumper in an elevated carrying position of the supporting means, and removable means engageable with said positioning means in a lowered loading position of the supporting means for elevating the same to the carrying position, said elevating means including a rod having an offset portion, guide means mounted by the load positioning means receiving the rod and a bumper jack device engageable with the offset portion of the rod to lift the supporting means from said loading position resting on the ground.

10. The combination of claim 9 wherein said load positioning means includes a channel member forming a tire-receiving track and at least two tire engaging bolts extending transversely through the channel member, said guide means comprising a pair of transversely aligned apertures formed centrally in the channel member through which the rod is adapted to extend.

11. In combination with a vehicle having a frame, a load carrier assembly connected to the frame including pivotal supporting means of adjustably fixed length mounted by the vehicle frame and extending therefrom beyond the vehicle, load positioning means connected to said supporting means spaced from the vehicle for receiving a load thereon, disconnectable link means connected to the supporting means and removably connected to the frame in an elevated carrying position of the supporting means, and means engageable with said positioning means in a lowered loading position of the supporting means for elevating the same to the carrying position, said elevating means including a load transfer member having an offset portion extending from the positioning means, and a jack device engageable with the offset portion to lift the supporting means from said loading position resting on the ground.

12. The combination of claim 11 wherein said supporting means includes a pair of adjustably extensible rod members and a crossbar interconnecting the rod members in spaced relation between the vehicle and the positioning means, said load transfer member being engageable with the crossbar.

13. The combination of claim 12 including stabilizing means connectable to the load and holding at least one of the extensible rod members at said adjustably fixed length.

14. In combination with a vehicle having a frame, a load carrier assembly connected to the frame including pivotal supporting means of adjustably fixed length mounted by the vehicle frame and extending therefrom beyond the vehicle, load positioning means connected to said supporting means spaced from the vehicle for receiving a load thereon, disconnectable link means connected to the supporting means and removably connected to the frame in an elevated carrying position of the supporting means, and means engageable with said positioning means in a lowered loading position of the supporting means for elevating the same to the carrying position, said supporting means including a pair of adjustably extensible rod members and a crossbar interconnecting the rod members in spaced relation between the vehicle and the positioning means, and stabilizing means connectable to the load and holding at least one of the extensible rod members at said adjustably fixed length.

References Cited

UNITED STATES PATENTS

| | | | |
|---|---|---|---|
| 2,593,796 | 4/1952 | Riewerts | 224—42.44 X |
| 2,204,824 | 6/1940 | Rock | 224—42.08 |
| 3,210,117 | 10/1965 | Hall | 224—42.07 X |
| 3,251,520 | 5/1966 | Van Dyke et al. | |
| 3,334,761 | 8/1967 | Perri | 214—450 |

HUGO O. SCHULZ, Primary Examiner

U.S. Cl. X.R.

224—42.44